United States Patent

Kayano et al.

[11] Patent Number: 5,613,303
[45] Date of Patent: Mar. 25, 1997

[54] OIL LEVEL GAUGE

[75] Inventors: Shigeru Kayano; Kyokuichi Sato, both of Soja, Japan

[73] Assignee: OM Corporation, Okayama, Japan

[21] Appl. No.: 502,559

[22] Filed: Jul. 14, 1995

[30] Foreign Application Priority Data

Jul. 15, 1994 [JP] Japan .................................. 6-163637

[51] Int. Cl.$^6$ .................................................. G01F 23/04
[52] U.S. Cl. .................................................. 33/731; 33/722
[58] Field of Search ............................. 33/731, 721, 722, 33/726, 727, 728, 730

[56] References Cited

U.S. PATENT DOCUMENTS

| | | |
|---|---|---|
| 3,488,855 | 1/1970 | Howe . |
| 4,021,924 | 5/1977 | Haines ........................ 33/731 |
| 4,761,886 | 8/1988 | Wilson et al. .................. 33/722 |
| 4,941,268 | 7/1990 | Tausk ......................... 33/722 |
| 4,965,942 | 10/1990 | Hoszowski .................... 33/731 |
| 5,113,594 | 5/1992 | Ishihara et al. . |
| 5,485,681 | 1/1996 | Hitchcock ..................... 33/731 |

FOREIGN PATENT DOCUMENTS

| | | |
|---|---|---|
| 3046519 | 2/1991 | Japan ........................ 33/731 |
| 5-32706 | 4/1993 | Japan . |

*Primary Examiner*—Christopher W. Fulton
*Attorney, Agent, or Firm*—Koda and Androlia

[57] ABSTRACT

An oil level gauge having a simple structure so as to be readily assembled, an accidental disconnection of a handle from a rod being prevented, favorable contact between a rubber packing and an inner wall of a gauge insertion pipe being assured, and a reliable water-proof arrangement being obtained to prevent water from entering into an oil tank. The oil level gauge includes a rod including an oil level indicator at its lower end, a handle provided at an upper portion of the rod, and a rubber packing fitted on the rod in the vicinity of the handle; and these components are tightly assembled each other via a pressing force provided by the rubber packing which is being compressed.

4 Claims, 5 Drawing Sheets

OIL LEVEL GAUGE

BACKGROUND OF THE INVENTION

1. Field of the Invention

The present invention relates to an improvement of an oil level gauge for measuring the oil level in an oil tank installed in an automobile.

2. Prior Art

Typically, an oil level gauge comprises a rod, a handle and a rubber packing as disclosed in, for example, U.S. Pat. Nos. 3,488,855, 4,941,268, 5,113,594, etc. The rod is ordinarily made of spring steel so that it can be elastically deformed. The handle is made of steel wire or synthetic resin and can be used as a lid for a gauge insertion hole. The packing can be used as the lid for the gauge insertion hole.

In the oil level gauge having such a structure of the various parts, the rod has to be securely connected to the handle when the gauge is inserted into or pulled out of the gauge insertion hole, and water must not enter into the oil tank through the gauge insertion hole. In order to meet these requirements, typically, the rod and the handle are mechanically connected to each other by means of rivets, and the rubber packing is adhered to the rod during baking. Alternatively, a separately-manufactured cup-like lid is attached to the rod and fixedly connected by brazing.

These conventional oil level gauges have various disadvantages such that the assembling of the components is too tedious to manufacture the oil level gauges efficiently and that the oil level gauges are heavy because the spring steel is used. In this connection, it has been thought of to make the rod and the handle of synthetic resin, light metal or the like for the purpose of reducing the weight of the oil level gauge. Also, in order to facilitate the assembling of the components into the oil level gauge, a study has been made of such structure of the oil level gauge that the components can be readily assembled by snap action.

In case of the snap-fitting structure, the components of the oil level gauge are not integrally connected by welding or the like. Thus, it is necessary to satisfy the following requirements: (1) the rod and the handle are engaged with each other by a mechanical strength which is enough to prevent accidental disconnection of the rod from the handle when the oil level gauge is inserted into or extracted from the gauge insertion pipe; and (2) water does not enter into the oil tank through a gap at the joint portion between the rod and the handle. As a method for realizing the above item (1), it is a common measure to make an engagement portion of the rod by rigid snap-fitting claws and to utilize a larger engagement structure. In such conventional methods, problems still remain that an efficiency in assembling work is decreased and that the rod and the handle cannot be formed to have large sizes and necessary shapes for assuring sufficient strength since a space an oil level gauge occupies is restricted.

Meanwhile, there is another factor for accidental disconnection of the handle. That is, the rubber packing sticks to an inner wall of the gauge insertion pipe. As a method for preventing this rubber sticking problem, it has been suggested to make the contacting surface of the rubber packing coarse. However, this method has problems that a packing product is not smoothly detached from the die during molding process and that the rubber debris often adheres on the surface of the die.

SUMMARY OF THE INVENTION

In view of the above, the present invention aims to achieve all of the following objects: (1) to provide an oil level gauge having such a simple structure as to be easily assembled; (2) to surely prevent accidental disconnection of a handle from a rod; (3) to ensure favorable contact between a rubber packing and an inner wall of an oil gauge insertion pipe to thereby prevent sticking of the rubber packing to the inner wall of the pipe; and (4) to obtain a reliable waterproof arrangement to prevent water from entering into an oil tank.

According to the invention, in order to accomplish the above-described objects, there is provided an oil level gauge comprising a rod including an oil level indicator at its lower end, a handle provided at an upper portion of the rod, and a rubber packing fitted on the rod in the vicinity of the handle. The handle includes a hollow body with a through hole, whose inner surface is formed with a stepped shoulder at the upper portion, and an upper opening portion above the stepped portion. The oil level gauge further comprises a cover attached on the upper opening portion of the handle to close it, the cover including a projection extending downwardly from a rear surface thereof. The rod is provided with a separation groove at its upper end, into which the downward projection of the cover is inserted. The rod also includes an engagement portion of which width at its distal end is smaller than a diameter of the through hole of the handle, the width of the engagement portion being increased so that it is larger than the diameter of the through hole at the proximal end. In addition, the rubber packing is provided at an upper portion of the rod so as to be located inside a skirt portion formed in the handle. The rubber packing is kept compressed in its axial direction and securely holds the handle on the rod via the elasticity.

The rubber packing includes ribs formed on an outer peripheral surface of expanded parts thereof. The ribs described above may be continuously formed on the outer peripheral surface of the packing like an annular ring. Alternatively, a plurality of projections having lengths of several millimeters may be spacedly provided.

DETAILED DESCRIPTION OF THE INVENTION

Figure 1:
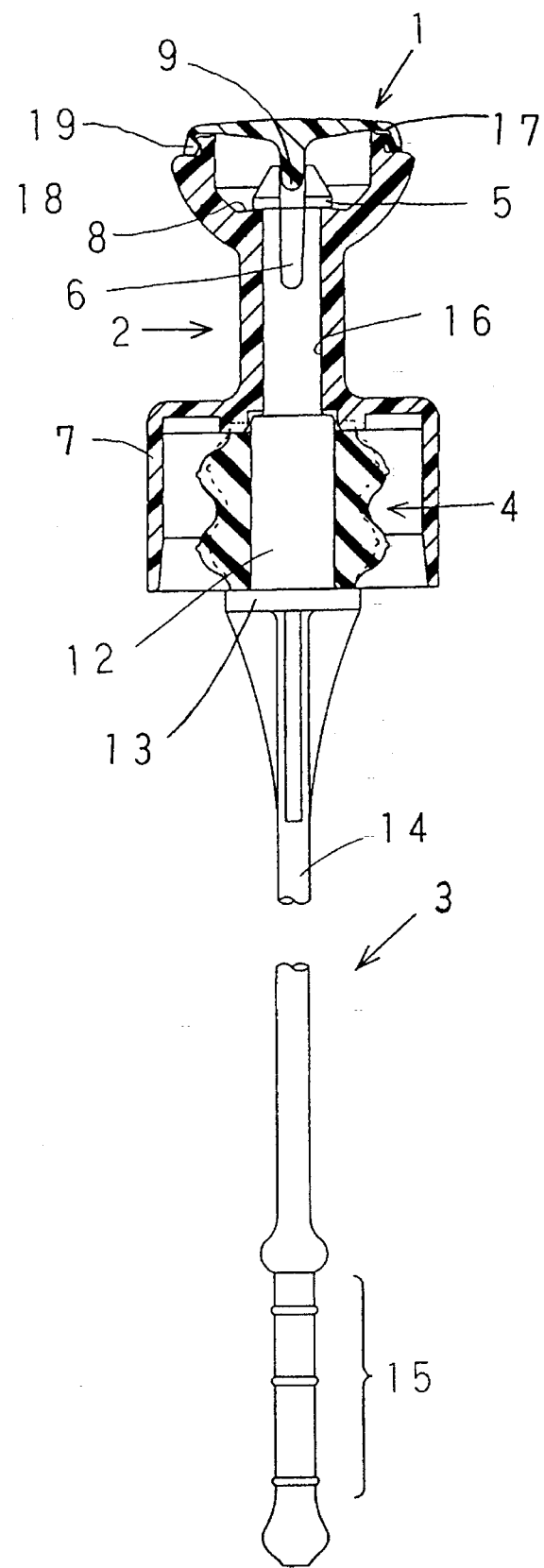
FIG. 1 is a front elevational view of an oil level gauge according to the present invention, cross-sectionally showing an essential portion of the oil level gauge.
Figure 2:
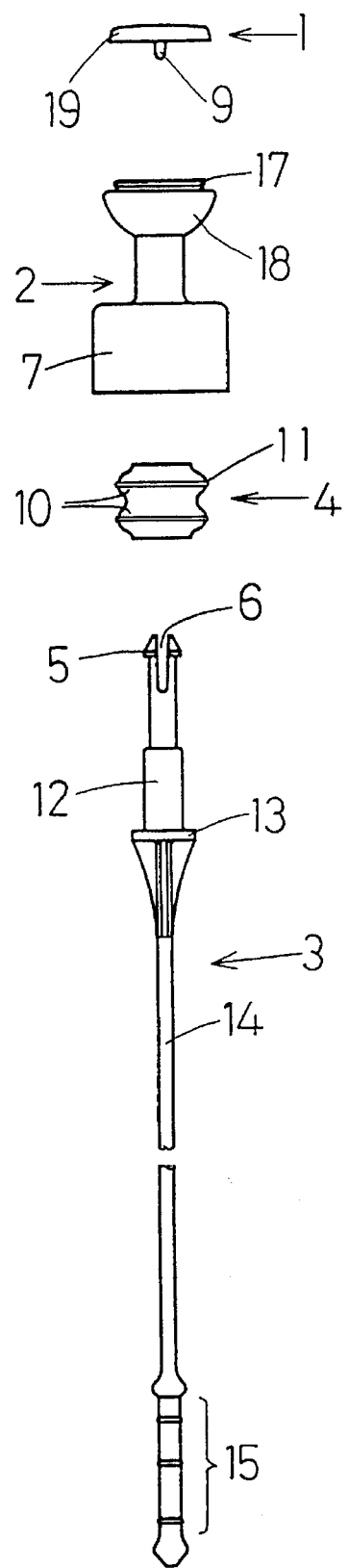
FIG. 2 is a front elevational view of the oil level gauge before it is assembled.
Figure 3:
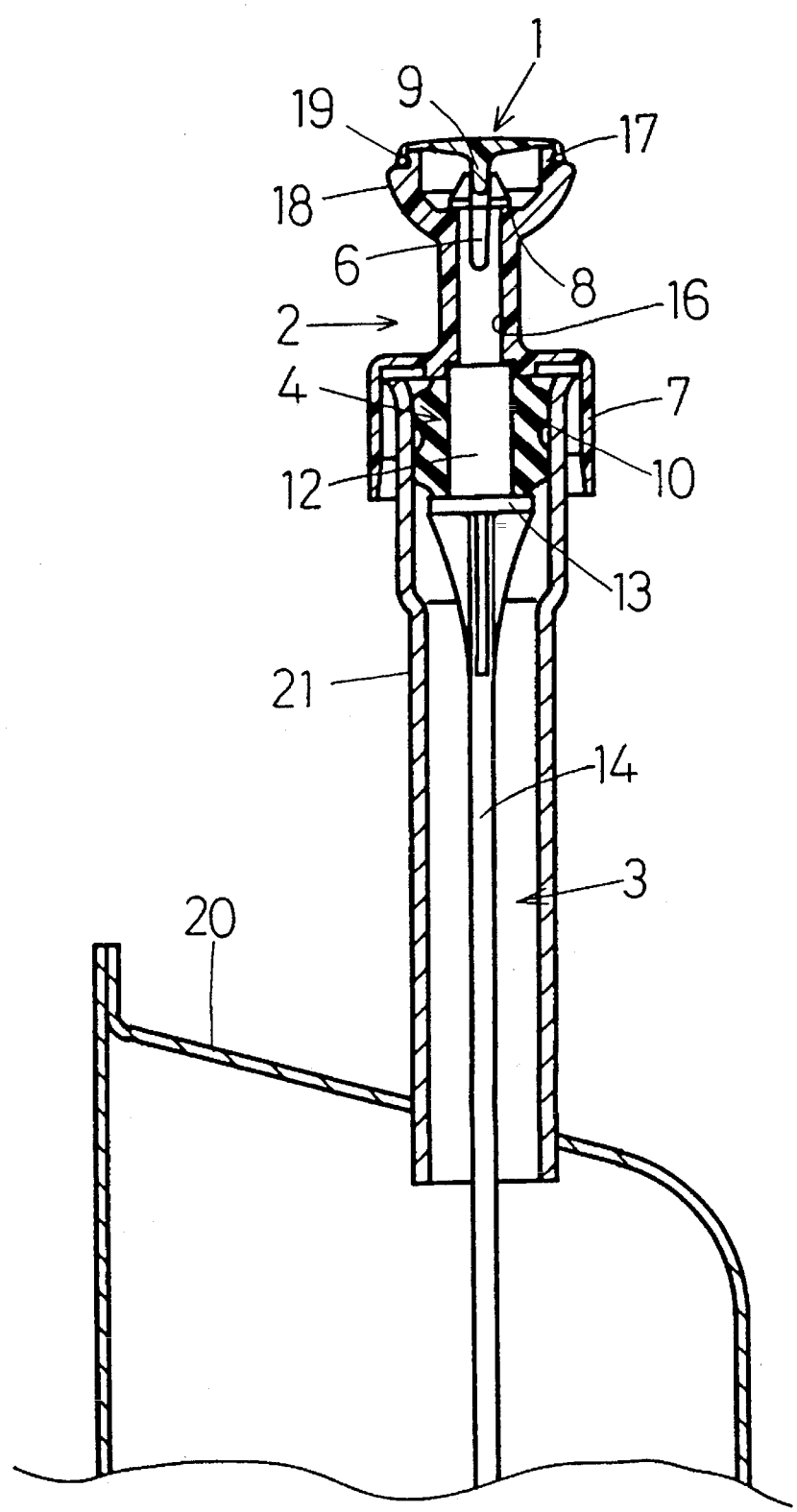
FIG. 3 is a cross-sectional view of the oil level gauge when it is inserted in a gauge insertion pipe of an oil tank.

FIG. 1 is a front elevational view of an oil level gauge according to the present invention, cross-sectionally showing an essential portion of the oil level gauge. FIG. 2 is a front elevational view of the oil level gauge before it is assembled. FIG. 3 is a cross-sectional view of the oil level gauge when it is inserted in a gauge insertion pipe of an oil tank.

As shown in these drawings, the oil level gauge of this invention comprises a rod 3 made of resin, a handle 2 mounted on an upper portion of the rod 3, and a rubber packing 4 fitted on the rod 3 in the vicinity of the handle. A cover 1 is attached to the handle 2. The open end of the gauge insertion pipe 21 is flared.

FIG. 2 is an exploded elevational view illustrating a series of components to be assembled into the oil level gauge. The rod 3 includes an engagement portion 5 and a separation groove 6 at its upper end portion. The engagement portion 5 has outwardly-extending claws for snap-fitting. Below the engagement portion 5, the rod includes an enlarged-diameter portion 12 on which the packing is fitted, and a flange 13 for limiting displacement of the packing. The rod further includes a small-diameter column-like portion 14 below the flange 13, and a flat oil level indicator 15 at its lower end.

As shown in FIGS. 1 and 3, the handle 2 includes a body having a through hole 16 and a skirt portion 7 at a lower portion of the body, a stepped shoulder 8 formed at an upper end of an inner surface of the hollow body, and a large-diameter opening portion above the stepped shoulder 8. The skirt portion 7 serves to cover the inlet of the gauge insertion pipe 21 of the oil tank 20. The stepped shoulder 8 is engaged with the engagement portion 5 composed of the snap-fitting claws. The handle 2 is provided with an engageable ridge 17 at its upper end, the ridge protruding radially outwardly so that the cover 1 for covering the opening portion of the handle can be attached to the handle by snap action. The diameter of the engageable ridge 17 is large at its upper portion and small at its lower portion. The handle 2 further includes a cup-like large-diameter knob portion 18 formed below the ridge 17.

The cover 1 is formed in a disk-like shape, and it includes a projection 9 downwardly extending from a rear surface of the cover. The downward projection 9 is adapted for being inserted into the separation groove 6. The cover 1 also includes a wall extending in parallel with the downward projection, the wall being formed at a peripheral edge of the cover on the same surface as the projection 9. An engageable edge 19 is provided at a distal end of the wall, the engageable edge protruding radially inwardly so as to engage with the above-described ridge 17.

Figure 4:
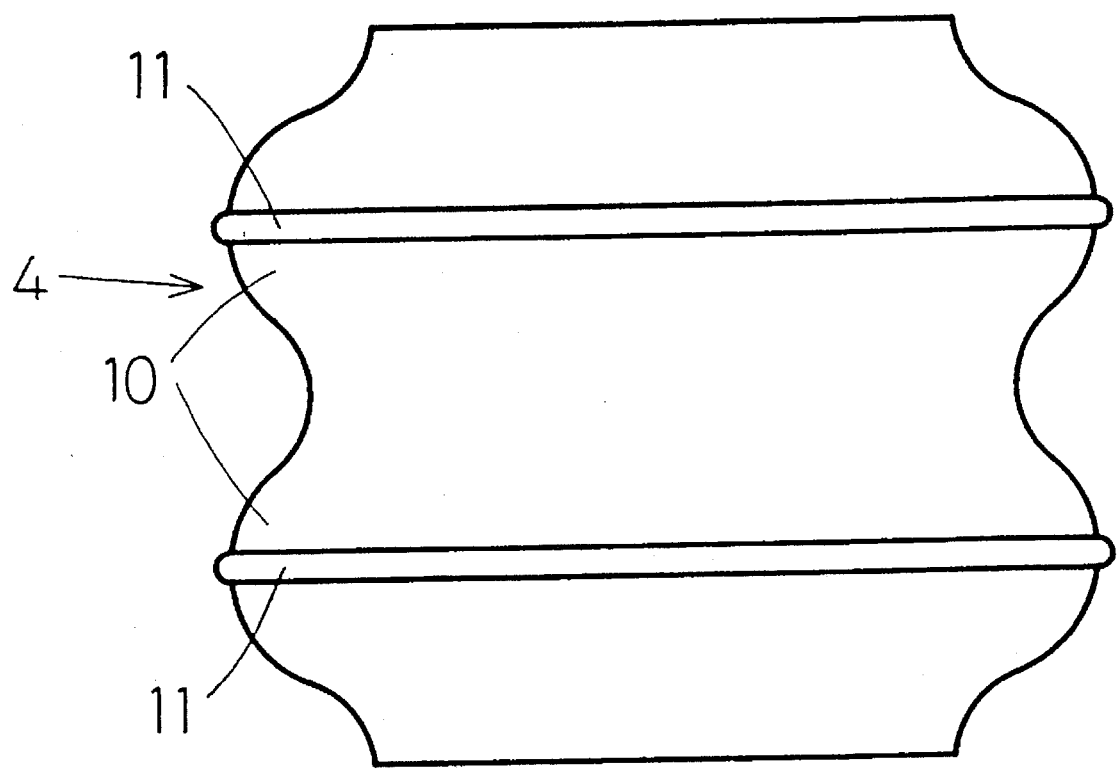
FIG. 4 is a front elevational enlarged view of a rubber packing.
Figure 5:
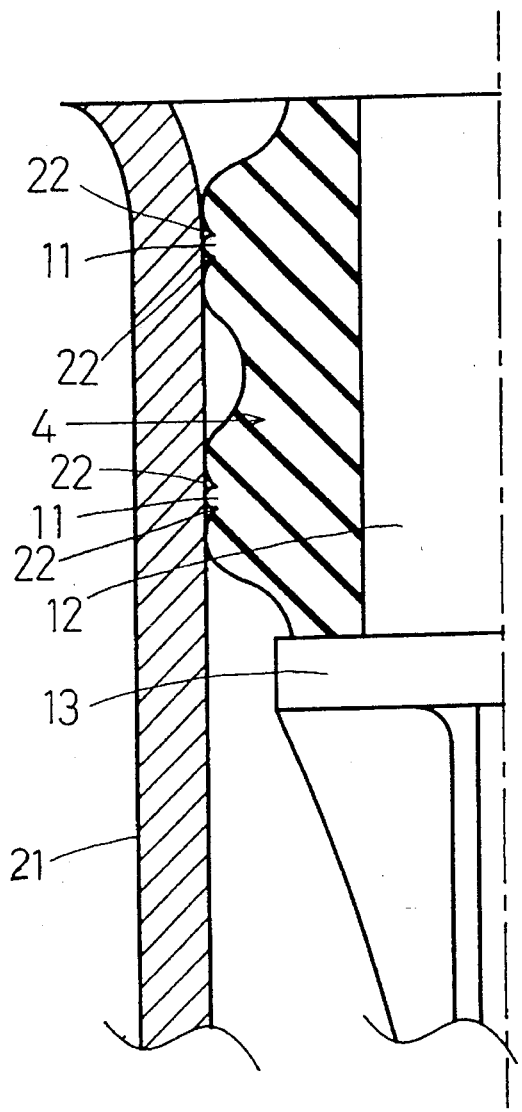
FIG. 5 is a cross-sectional enlarged view of the rubber packing when it is in close-contact with an inner wall of the gauge insertion pipe.

FIG. 4 is a front elevational view showing the rubber packing 4 on an enlarged scale. The rubber packing 4 is mounted on the upper portion of the rod 3, and it locates within the skirt portion 7 of the handle 2. The intermediate portion of the rubber packing 4 is reduced in diameter, and two expanded parts 10 are formed above and below the reduced-diameter intermediate portion. Ribs 11 are formed on an outer peripheral surface of the two expanded parts 10. Due to the ribs 11, when the packing 4 fitted on the rod is inserted in the gauge insertion pipe 21 as shown in FIG. 5, the ribs 11 are in press-contact with an inner wall of the pipe 21 so that concave portions 22 are formed above and below the ribs 11 of each expanded portion. Oil is collected in the concave portions 22, thereby preventing the rubber packing from sticking to the inner wall of the pipe 21.

Figure 6:
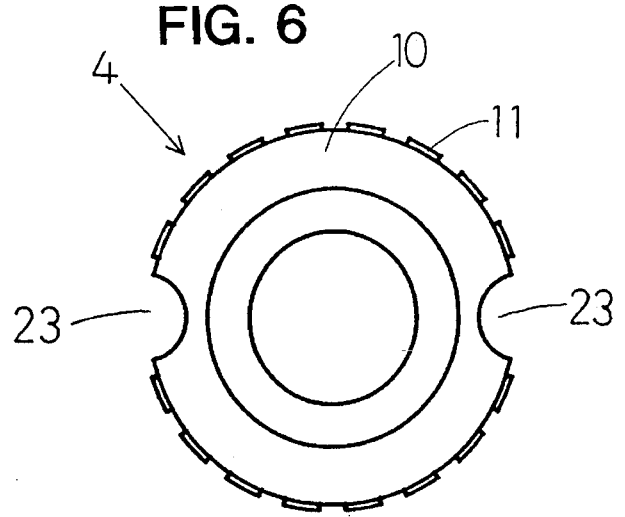
FIG. 6 is an enlarged plan view of a rubber packing according to another embodiment of the invention.

FIG. 6 is a plan view of a rubber packing 4 according to another embodiment of the invention, the rubber packing 4 including side grooves 23 extending substantially in parallel with the rod. The side grooves 23 are provided for assuring ventilation. The present invention can be applied also to a rubber packing without side grooves. The above-described skirt portion 7 prevents scattered water from entering into the oil tank when such side grooves for the ventilation are provided on the surface of the packing. In this embodiment, a number of protrusions 11 having small lengths are provided on an outer peripheral surface of expanded portions 10 of the packing at certain intervals.

According to the oil level gauge of the present invention, in case of assembling, when the upper portion of the rod 3 is inserted into the hollow body of the handle 2, the engagement portion 5 composed of the snap-fitting claws at the upper end of the rod passes through the hollow body of the handle because the separation groove is narrowed. The packing 4 is mounted on the upper portion of the rod 3 at the predetermined attachment position. When the engagement portion has passed through the hollow body, the separation groove 6 is restored to its original state so that the engagement portion 5 is brought into engaging condition with the stepped shoulder 8 of the handle 2. When the handle 2 is thus mounted on the rod 3, the rubber packing 4, which is formed to be slightly higher than the longitudinal length (or the height) of the skirt portion of the rubber packing, becomes compressed in the axial direction and, as a result, expands outwardly. In other words, the rubber packing 4 expands from the dotted line configuration to the solid outer line configuration as shown in FIG. 1. As a result, the engagement portion 5 of the rod 3 and the stepped shoulder 8 of the handle 2 are brought into secure contact because the stepped shoulder 8 of the handle 2 is pressed against the under surface of the engagement portion 5 of the rod 3 by the elasticity of the rubber packing 4. Thus, the handle 2 is securely held on the rod 3 in a stable fashion. Thus, the oil level gauge of the invention is reduced in weight and it has such a simple structure as to be easily assembled.

When the cover 1 is mounted on the upper opening portion of the handle 2, the downward projection 9 of the cover 1 is inserted in the separation groove 6. Accordingly, even if force is applied to the engagement portion 5 having the snap-fitting claws in such a direction that the separation groove 6 is narrowed, the downward projection restrains the separation groove 6 from being narrowed, and the rod 3 is not extracted nor disconnected from the handle 2. It is thus possible to surely prevent the handle 2 from being accidentally separated from the rod 3.

Because of the cover provided on the upper opening portion of the handle 2, water is prevented from entering into the oil tank.

Due to the ribs 11 provided on the outer peripheral surface of the expanded portions 10 of the rubber packing 4, when the packing is inserted in the gauge insertion pipe, the ribs 11 are in press-contact with the inner wall of the pipe so that the concave portions for collecting oil therein are formed above and below the ribs 11, thereby preventing the rubber packing from sticking to the inner wall of the pipe. Also, an area of contact between the rubber packing and the inner wall of the pipe is reduced because the concave portions are formed due to the ribs 11.

Since the oil level gauge of the present invention has the above-described structure, it is a remarkably excellent product which possesses the following advantages: (1) the oil level gauge is reduced in weight, and it can be assembled easily by snap action; (2) the handle and the rod can be surely prevented from accidentally being disconnected from each other; (3) the rubber packing can be kept from sticking to the inner wall of the gauge insertion pipe; and (4) it is possible to completely prevent water from entering into the oil tank.

What is claimed is:

1. An oil level gauge comprising:
    a rod having an oil level indicator at a lower end thereof, said rod being integrally provided with a separation groove formed in an upper portion thereof, an engagement portion at an upper end thereof, a flange at a middle portion thereof and an upper end of said flange is provided an enlarged diameter portion;

a handle mounted on said upper portion of said rod, said handle comprising a cylindrical hollow body and a skin portion formed continuously from a lower end of said cylindrical hollow body, said cylindrical hollow body being provided with a stepped portion being smaller in diameter than said engagement portion of said rod;

a cylindrical rubber packing provided on said enlarged diameter portion of said rod and inside said skin portion of said handle so that an upper end of said rubber packing is in contact with an inner top surface of said skin portion and a lower end of said rubber packing is compressed in an axial direction thereof by said inner top surface of said skirt portion and said flange of said rod, thus pressing and engaging by snap-fitted action said stepped portion of said handle against said engagement portion of said rod so as to hold said handle on said rod, and an upper cover on the handle attached to an upper end of said cylindrical hollow body of said handle, said cover being provided with a projection extending downwardly, said projection being inserted into said separation groove of said rod and a cover surface being engaged with said rod by snap-fitted action.

2. An oil lever gauge according to claim 1, wherein an outer peripheral surface of said cylindrical rubber packing is provided with at least two expanded portions.

3. An oil lever gauge according to claim 2, wherein a rib is provided on an outer peripheral surface of each of said expanded portions.

4. An oil lever gauge according to claim 1, further comprising longitudinally extending grooves provided in an outer surface of said cylindrical rubber packing.

* * * * *